(12) United States Patent
Harvey et al.

(10) Patent No.: US 7,768,424 B2
(45) Date of Patent: Aug. 3, 2010

(54) SMART METER READER

(75) Inventors: Ian Phillip Harvey, Brislington (GB); Neil Furmidge, Sheffield (GB); Richard Hall, Reading (GB); Tim Baker, Sheffield (GB)

(73) Assignee: F.C. Patents, LLC, Ocala, FL (US)

( * ) Notice: Subject to any disclaimer, the term of this patent is extended or adjusted under 35 U.S.C. 154(b) by 598 days.

(21) Appl. No.: 11/773,429

(22) Filed: Jul. 4, 2007

(65) Prior Publication Data
US 2008/0042873 A1    Feb. 21, 2008

Related U.S. Application Data

(62) Division of application No. 09/979,795, filed as application No. PCT/GB00/02032 on May 26, 2000, now Pat. No. 7,259,690.

(30) Foreign Application Priority Data
May 28, 1999    (GB) .................................. 9912559.3

(51) Int. Cl.
*G08C 19/20* (2006.01)
(52) U.S. Cl. .............................. 340/870.03; 340/539.11; 340/10.1; 340/10.4; 340/870.02; 705/412; 235/440
(58) Field of Classification Search ................................. 340/870.02–870.03, 539.11, 10.1, 10.4, 340/539.14, 572.4; 705/412; 235/436, 440
See application file for complete search history.

(56) References Cited

U.S. PATENT DOCUMENTS

| | | | | |
|---|---|---|---|---|
| 4,132,981 A | * | 1/1979 | White | 340/870.02 |
| 4,463,354 A | * | 7/1984 | Sears | 340/870.02 |
| 4,758,836 A | * | 7/1988 | Scuilli | 340/870.31 |
| 5,111,407 A | * | 5/1992 | Galpern | 702/62 |
| 5,252,967 A | * | 10/1993 | Brennan et al. | 340/870.02 |
| 5,298,894 A | * | 3/1994 | Cerny et al. | 340/870.02 |
| 5,602,744 A | * | 2/1997 | Meek et al. | 705/412 |
| 6,078,251 A | * | 6/2000 | Landt et al. | 340/10.41 |
| 6,264,106 B1 | * | 7/2001 | Bridgelall | 235/462.46 |
| 6,509,828 B2 | * | 1/2003 | Bolavage et al. | 340/10.1 |
| 6,617,962 B1 | * | 9/2003 | Horwitz et al. | 340/10.4 |
| 6,720,866 B1 | * | 4/2004 | Sorrells et al. | 340/10.4 |
| 6,963,282 B1 | * | 11/2005 | Yeates et al. | 340/572.4 |
| 7,002,473 B2 | * | 2/2006 | Glick et al. | 340/572.1 |
| 7,259,690 B1 | * | 8/2007 | Furmidge et al. | 340/870.03 |

* cited by examiner

*Primary Examiner*—Albert K Wong
(74) *Attorney, Agent, or Firm*—Monty Simmons; Simmons Patents

(57) ABSTRACT

The reader (1) for a utility meter is disclosed. The reader (1) is capable of receiving data, in a variety of different protocols, by either inductive coupling or by radio frequency transmission. The reader (1) is a hand-held device which comprises an inductive read nozzle (2), a RF module, a display (4), a keypad (5) a trigger switch (6), a handle (7) a communication port (8), a battery charging interface (9), a memory and a microprocessor. The reader (1) is capable of storing utility usage data in memory and/or downloading utility usage data to a computer through the communication port (8).

20 Claims, 3 Drawing Sheets

SMART METER READER

RELATED APPLICATIONS

The present application is a divisional of recently allowed U.S. application Ser. No. 09/979,795 now U.S. Pat. No. 7,259,690 which was a national phase application of PCT/GB00/02032, filed May 26, 2000, which claims priority to British Application Serial Number 9912559.3, filed May 28, 1999, the disclosures of which are hereby incorporated by this reference herein in their entirety.

BACKGROUND AND SUMMARY

This invention relates to a reader for a meter, and more specifically, although not exclusively, to a hand-held reader for a utility meter, particularly a water meter.

A wide variety of utility meters are known for measuring the supply of utilities, for example, gas, water and electricity. The measurement of utility supply allows each consumer to be charged according to the level of their use of the supply and discourages wasting of natural resources.

Although utility meters are, in general, provided with a display for displaying the level of utility consumption, the meters may often be located in inaccessible places. To facilitate the ease of reading the meter there is often a remote reading device provided. This may be a pad coupled to the meter through a wire link, or alternatively a radio frequency (RF) module. For a pad, the meter is read by electromagnetic inductive coupling through the pad with a reader device (in close proximity to the gad). For an RF module, the meter is read using radio frequency transmission (usually having a maximum range of about 90-400 meters) to transmit the utility usage data to a reader device having a suitable RF module.

Numerous utility meters are commercially available, and each may be provided with either a pad or an RF module for remote readings. In addition, the form of the data transmitted, specifically the data communication protocols, varies with each meter. This makes it difficult to provide a reading device which is able to read all the different possible meter types.

It is an object of the present invention to seek to mitigate these disadvantages.

According to the present invention there is provided apparatus for reading a meter, comprising means for receiving data by radio frequency transmission from the meter, and means for inductively receiving data from the meter.

The apparatus may include an algorithm to determine the form of the incoming data from the initial portion of an incoming data stream. This scheme of meter reading is described in GB 2 277 392, which is hereby incorporated by reference. Once the form of the incoming data has been recognized then the data can be successfully received.

Prior art apparatus has employed a list of possible protocols for the data. The incoming data is examined using sequential trial reading, progressing through the list after each failure to recognize the data. This method may involve receiving the same data four or five times before it is correctly decoded. The use of the algorithm described above results in a faster read time for each meter, since the data protocols are determined from the initial portion of incoming data.

The algorithm may conveniently compare the first ten bits of an incoming data stream with a stored list of known protocols.

The meter may be a utility meter, such as a water meter.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
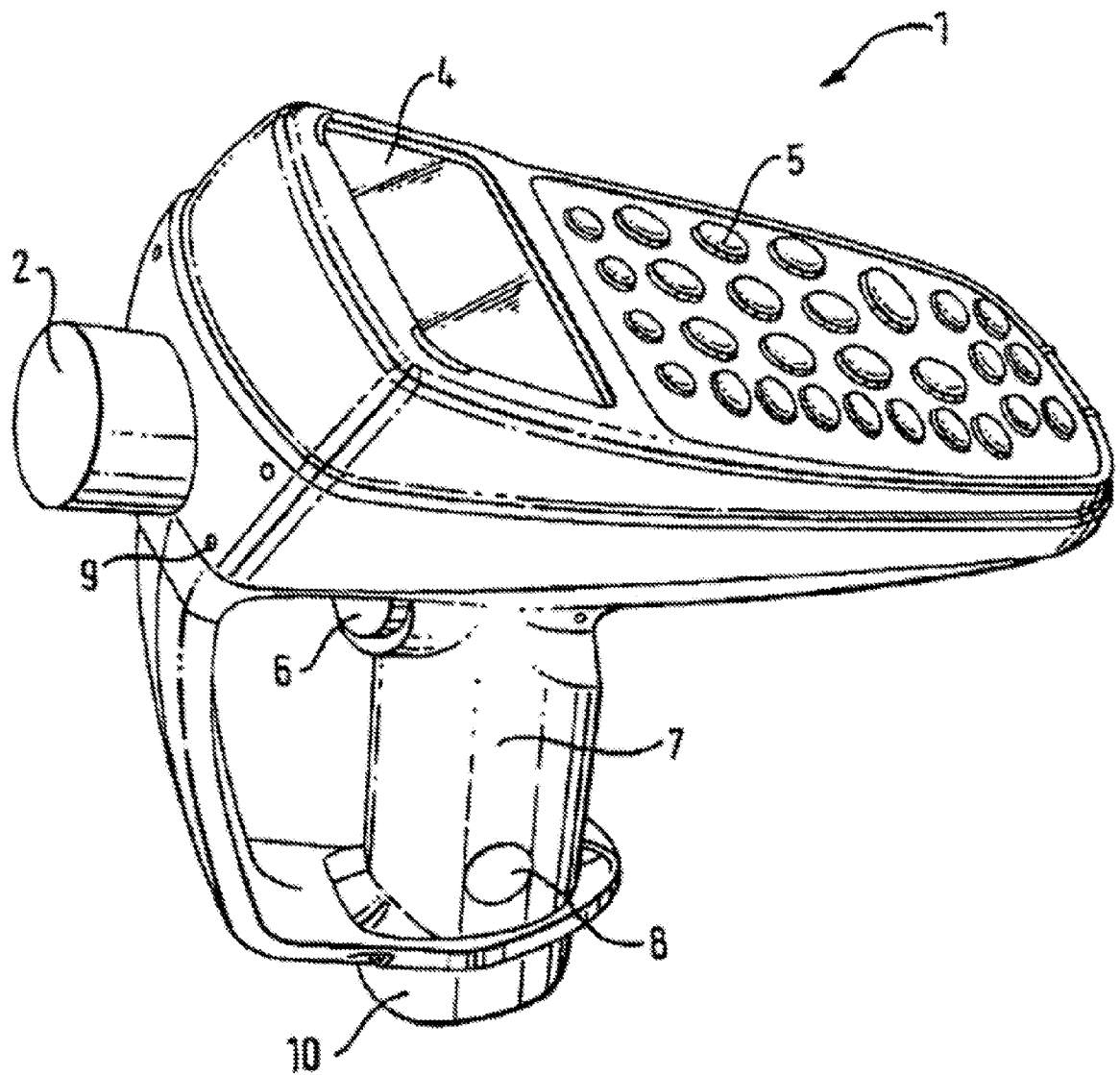
FIG. 1 shows a first perspective view of a meter reader according to the present invention.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

Figure 2:
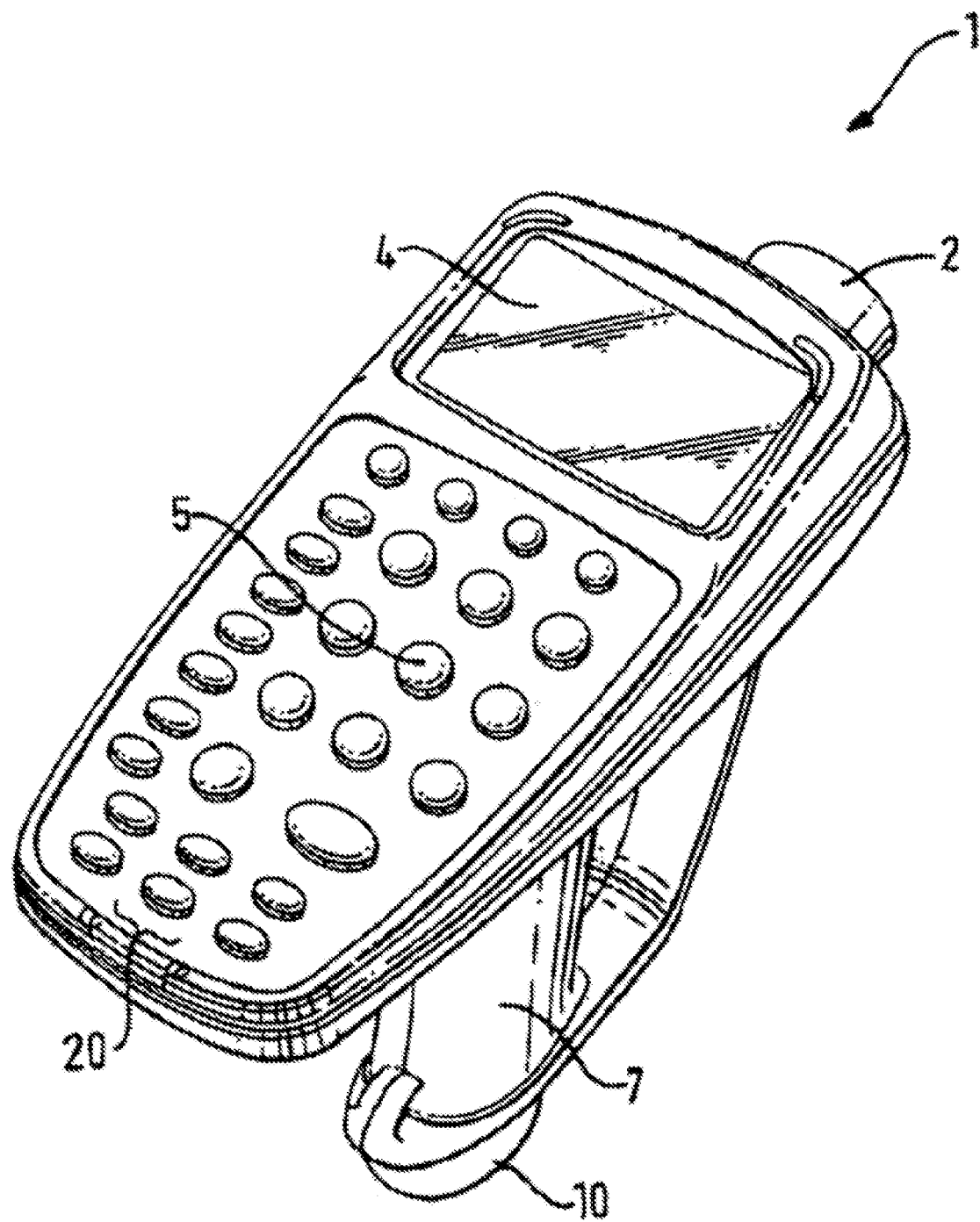
FIG. 2 shows a second perspective view of the meter reader.
Figure 3:
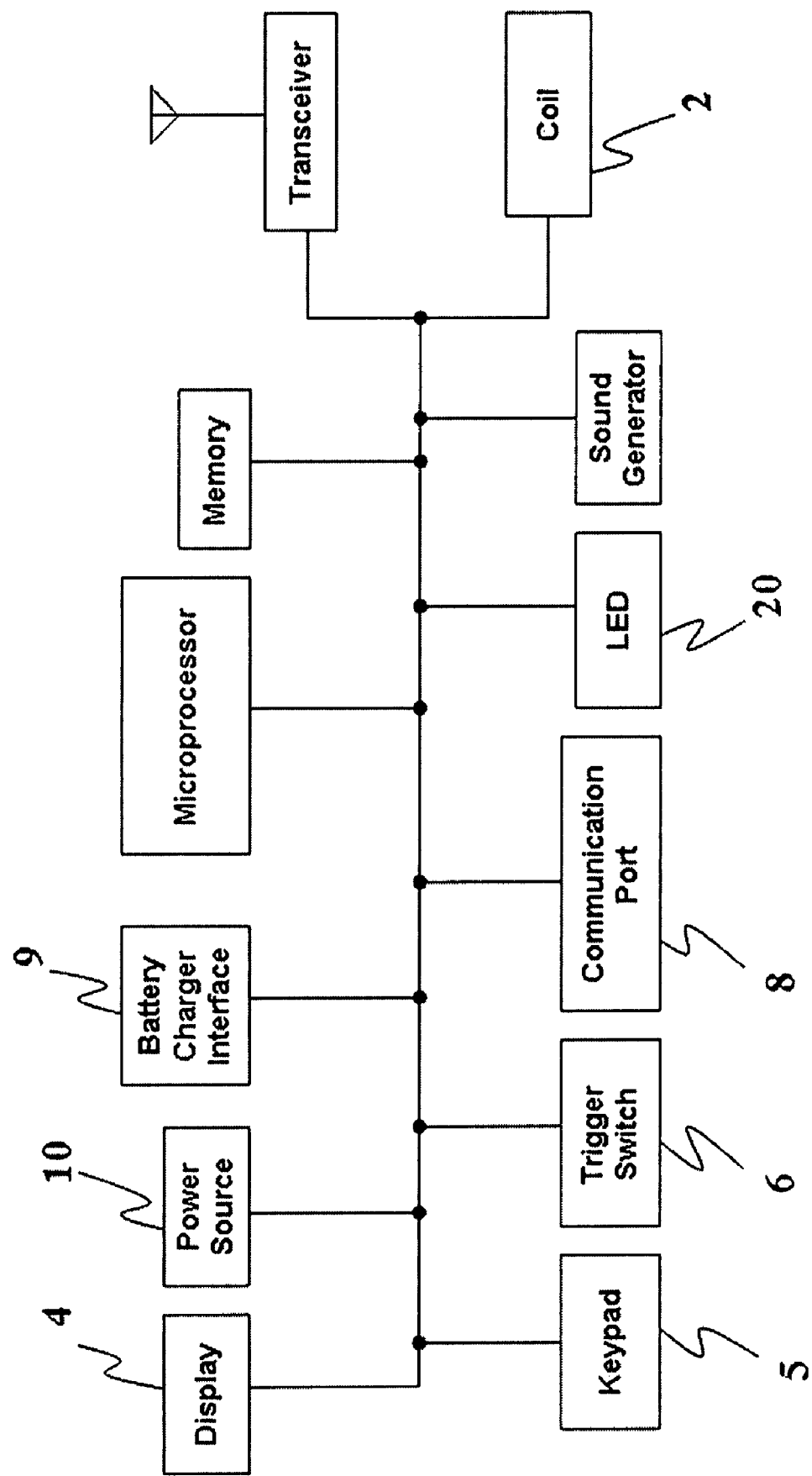
FIG. 3 is a block diagram illustration of the various components according to one exemplarily embodiment of the invention.

A reader 1 is shown in FIGS. 1 and 2. The reader 1 comprises a nozzle 2, an RF module (not visible), a display 4, a keypad 5, a trigger switch 6, a handle 7, a communication port 0 and a battery charging interface 9, The reader also includes a memory and a microprocessor (not visible).

The nozzle 2 contain8 a coil (not shown), and is used to read a water meter through a pad connected by wire to a water meter. The meter reading is carried out by inductive coupling between the nozzle 2 and the pad. When the trigger switch 6 is operated an interrogation signal is applied to the coil which is inductively coupled to a coil in the pad. After the pad has received the interrogation signal it causes the meter reading to be generated as a data signal in the pad coil, which signal is transferred by the inductive coupling to the coil in the reader, and from that: coil to the microprocessor, in the reader.

The shape and configuration of the nozzle 2 are such that all known pads may be read. The nozzle 2 is replaceable, and may be easily swapped for a new nozzle should it sustain damage or if future developments result in a different design.

The reader 1 is able to read any water meter known to the applicant at the time of filing this patent application, even though different manufacturer's meters send data in different formats. When the first portion of incoming data is received by the reader 1 the software will examine the first few (about ten) bits of data to determine the format of the data, and hence the applicable data communication protocols. When this determination has been made the meter may then be read and interpreted successfully. This scheme of meter reading is described in GB 2 277 392.

The RF module allows the reader 1 to read water meters using RF transmission. All known water meters known to the applicant at the time of filing this patent application fitted with a suitable RF module may be read.

Combining the inductive read nozzle 2 and the RF module into a single reader 1, in combination with software which determines the make of the meter, allows a larger number of water meters to be read.

The user does not have to know in advance which type of reading method is required in order to switch the reader 1 into the correct mode. Instead, a meter reading route may be programmed in advance into the reader 1. The programmed route will include information about the type of reading to be made at each location and will switch the reader into the correct reading mode (inductive/RF) automatically, or will indicate to the user that manual keyword entry is required. The meter reading is initiated by the user pressing the trigger 6.

The programmed route may include data indicating what the expected reading should be at each location. If the actual reading is significantly different, the probe will automatically prompt the user to investigate for tampering, etc.

The LED 20 on the front of the reader indicates to the user the status of the meter reading. Red may indicate that the reading has been unsuccessful; amber may indicate that the reading is in progress, and green may indicate further reading has been successfully completed. A different audible signal is produced in each of these states. The LED and audible signals are in addition to status information appearing on display 4. Providing status indications in a number of forms is advantageous because the pad for obtaining the meter reading may be in a difficult to access position. The display 4 may be obscured. It may be noisy so that the audible signal cannot be recognized by the user.

The memory is used to store readings until they are downloaded. The user may also use the keypad to input meter readings or further information to accompany the meter readings. The microprocessor includes a real time clock which is used to time and date stamp readings. Up to 4000 readings can be stored.

The communication port 8 is an RS-232 data port which can be used to provide direct electronic connection between the reader 1 and, for example, a computer. This may be used to download stored meter readings into the computer or to program a meter reading route into the reader 1. Software upgrades for the reader 1 may also be performed through the port, for example this could allow the operating system to be upgraded externally without having to replace the processor.

The display 4 is a high resolution liquid crystal display, suitable for displaying data from a meter reading, instructions to the user, or graphical information.

The RF module includes a bi-directional radio and is provided with a number of different possible functions. The first mode of operation involves the RF module transmitting a signal which causes water meters in range to begin transmitting. A large number of nearby water meters (each having an RF module) will usually respond, transmitting their data. This data includes the meter's individual identification number and the meter reading. The meters transmit data in a time staggered manner, so that the data from each meter is received at a different time. Transmission could be delayed according to each meter's ID number, according to a value from a random number generator, or according to a meter's ID number multiplied by a value from a random number generator.

The RF module in the reader 1 may have to receive a large number of responses, for example from 400 water meters, and will store these in memory.

A second mode of operation for the RF module is two-way transmission, which allows the reader 1 to interrogate a specific water meter. This mode is especially useful if during the first mode of operation the reader 1 fails to record or distinguish one of the incoming transmissions. The RF module will transmit a specific signal, which includes the identification number for the nominated water meter. All nearby water meters will receive the transmission, but only the one which has the relevant identification number will respond, transmitting data to the reader 1.

A third mode of operation for the RF module provides a RF link between the reader 1 and a computer. The computer may be located, for example, in a vehicle of the user when he is carrying out a number of meter readings. The meter readings can be downloaded to the computer through the RF link as an alternative to using a direct data link through the port 8. This may be done automatically by the reader 1 if the memory storage is almost full. Also, if the meter reading route is stored in a computer instead of in the reader 1 then the reader 1 can be provided with information about the next meter reading through the RF link.

The data is downloaded in CDT (Comma Delimited Text) format. Data may be selectively downloaded. The reader is capable of reading data at two or more frequencies. This allows a wider variety of meters to be read by the probe.

The reader 1 includes a power source, provided by a battery 10 in the handle 7. This may be recharged through the battery charging interface 9 or may be replaced.

The keypad 5 and software run by the reader 1 may allow for personalization of the reader. For example the reader could request entry of a user name and password.

The reader may also include a means which allows an appropriately configured pad or meter to be programmed via a signal from the nozzle 2. The reader can alter the serial number of a meter or may reset the meter count.

The probe described above is the most complex embodiment. The probe would be provided with less memory (to store, for example, 10-100 readings). In this instance "a hand-held" computer would also be carrier by the user and readings would be transmitted by cable or radio to the hand-held computer. The reader provides the user with a menu allowing him or her to configure the output for different types of hand-held computer.

The probe (or a hand-held computer, if one is connected) may provide a menu and means that allow the user to set which type of meters are to be read. If the list of meters is restricted, the meters can be read more quickly because the algorithm (from GB 2 277 392) will need to test for fewer data types.

The reader may be used with the meter described in United Kingdom patent application number 9912561.9 which is hereby incorporated by reference.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A method of transferring data from a utility meter to an electronic device, said method comprising the steps of:
    configuring a reader with a RF module and an inductive module, each electrically associated with a processing device that is further electrically associated with a memory and a power source;
    storing route data in said memory wherein said route data includes a plurality of interrogation signal formats wherein one of such interrogation signal formats is required to transmit the an interrogation signal needed to activate a utility meter installed at a specific route location so that such utility meter begins transmitting meter data; and
    configuring said reader to select one of said RF module and said inductive module and to use the selected module to automatically transmit an the interrogation signal in response to receiving route location information based on said route data.

2. The method of claim 1, further comprising the step of: configuring said interrogation signal format to include a unique identifier so that only one meter or one meter group responds to said interrogation signal.

3. The method of claim 1, further comprising the step of: configuring said utility meter is to delay transmitting said meter data according to time value based on the meter's identification number.

4. The method of claim 1, further comprising the step of: configuring said utility meter to delay transmitting said meter data according to randomly generated time value.

5. The method of claim 1, further comprising the step of: configuring said reader with a communication port for transferring data to a remote electronic device.

6. The method of claim 5, wherein said remote electronic device is a computing device associated with a vehicle.

7. The method of claim 5, wherein said remote electronic device is a computing device associated with the person using said reader.

8. A method of transferring data from a utility meter to an electronic device, said method comprising the steps of:
    associating a meter transceiver selected from a plurality of transceiver types with a utility meter, wherein said meter transceiver is configured to transmit a meter data signal upon receiving an a properly formatted interrogation signal, and wherein said transmitted meter data signal has a data format specific to the transceiver type selected;
    configuring a reading device with a RF module electrically associated with a processing device that is further electrically associated with a memory and a power source;
    storing route data in said memory wherein said route data includes the interrogation signal format information for each of said plurality of transceiver types;
    configuring said reader to automatically transmit an a properly formatted interrogation signal for said meter transceiver in response to receiving route location information and using at least part of said route data; and
    configuring said reader to automatically determine the transceiver meter data signal format required to receive the transmitted meter data signal and transfer at least part of said meter data to one of (a) said memory and (b) a remote electronic device.

9. A method of transferring data from a utility meter to an electronic device as in claim 8, said method further comprising the step of: configuring said reading device with an inductive module electrically associated with said processing device.

10. A method of transferring data from a utility meter to an electronic device as in claim 9, said method further comprising the step of: configuring said reader select one of said RF module and said inductive module and to automatically transmit an interrogation signal in response to receiving route location information and using at least part of said route data.

11. A method of transferring data from a utility meter to an electronic device as in claim 8, further comprising the step of: storing, in said memory, expected meter data for specific utility meter and further configuring said reader to compare said expected meter data to the received meter data.

12. A method of transferring data from a utility meter to an electronic device as in claim 11, further comprising the step of: generating a warning when results of said comparison meets predefined warning criteria.

13. A method of transferring data from a utility meter to an electronic device as in claim 8, further comprising the step of: generating at least one of a visual and audio alert indicating the status of a read attempt.

14. A method of transferring data from a utility meter to an electronic device as in claim 8, further comprising the step of: configuring the reader with a communication port for transferring meter data to a remote electronic device.

15. A method of transferring data from a utility meter to an electronic device, said method comprising the steps of:
    configuring a reader with a RF module and an inductive module, each electrically associated with a processing device that is further electrically associated with a memory and a power source;
    storing route data in said memory wherein said route data includes a plurality of interrogation signal formats wherein one of such interrogation signal formats is required to transmit an interrogation signal needed to activate one or more utility meters installed at a specific route location so that said one or more utility meters begin transmitting a meter data signal in a predefined signal format;
    configuring said reader to automatically select one of said RF module and said inductive module for transmitting said integration signal and further configuring said reader to automatically transmit an interrogation signal using at least part of said routed data and in response to receiving route location information; and
    configuring said reader to automatically determine said predefined signal format required to receive the transmitted meter data signal and transfer at least part of the received meter data to one of (a) said memory and (b) a remote electronic device.

16. A method of transferring data from a utility meter to an electronic device as in claim 15, further comprising the step of: configuring said reader with a communication port for transferring data to a remote electronic device.

17. A method of transferring data from a utility meter to an electronic device as in claim 15, further comprising the step of: configuring said reader to transmit said interrogation signal at a plurality of frequencies.

18. A method of transferring data from a utility meter to an electronic device as in claim 17, further comprising the step of: further configuring said reader to automatically select the interrogation signal frequency from said plurality of frequencies based on at least part of said routed data and current location information.

19. A method of transferring data from a utility meter to an electronic device as in claim 15, further comprising the step of: generating a visual and audio alert indicating the status of a read attempt.

20. A method of transferring data from a utility meter to an electronic device as in claim 15, wherein said interrogation signal includes information for configuring the power level used by said utility meter to transmit said meter data signal.

\* \* \* \* \*